Oct. 17, 1950 G. B. LOPER 2,526,608
GAIN CONTROL SYSTEM FOR SEISMOGRAPHS
Filed March 27, 1945 2 Sheets-Sheet 1

INVENTOR.
GEORGE B. LOPER
BY
Sidney A. Johnson
ATTORNEY

Oct. 17, 1950     G. B. LOPER     2,526,608
GAIN CONTROL SYSTEM FOR SEISMOGRAPHS

Filed March 27, 1945     2 Sheets-Sheet 2

INVENTOR.
GEORGE B. LOPER
BY
Sidney A. Johnson
ATTORNEY

UNITED STATES PATENT OFFICE 2,526,608

GAIN CONTROL SYSTEM FOR SEISMOGRAPHS

George B. Loper, Dallas, Tex., assignor, by mesne assignments, to Socony-Vacuum Oil Company, Incorporated, New York, N. Y., a corporation of New York Application March 27, 1945, Serial No. 585,095

7 Claims. (Cl. 179—171)

This invention relates to electric seismographs, more particularly to systems of controlling the gain in amplification so that seismic signals may be recorded with a substantially constant average amplitude, and has for an object the provision of an automatic volume control system which requires a minimum of additional circuit elements and yet which is reliable in operation.

In seismic prospecting systems a charge of dynamite, located in a shot hole, is detonated to produce seismic waves which are reflected from interfaces located below the earth's surface. These reflected waves are attenuated by their travel through the underground strata. The deeper the interface, the less is the amplitude of the reflected waves although, of course, the particular character of the interface or of the adjoining subsurface strata also plays a part in determining the amplitude of the waves. Heretofore, automatic volume control systems, and systems in which the gain is controlled as a function of time, have been utilized in an effort to provide on the photographic record or seismogram signals whose average amplitude is relatively constant. Heretofore, satisfactory automatic volume control systems have required separate transformers, and/or separate anode sources of supply for the AVC part of the amplifying system.

In accordance with the present invention, a satisfactory automatic volume control (AVC) system is provided without the need for the separate transformer and only a single source of supply is required for both the amplifier and the AVC systems. There is provided, with a minimum of vacuum tubes and other circuit elements, a high degree of control whereby input signals of widely varying amplitude produce output signals whose amplitudes vary by only a few per cent. More particularly, an AVC stage is capacitively coupled to the amplifier and through a control network a capacitor is charged through one circuit, and discharged through another circuit of the network including a diode and a resistor. The arrangement provides a voltage negative with respect to ground and negative with respect to the negative terminal of the anode supply. The negative potential or voltage is applied to the suppressor grid or control grid of the amplifier tubes in a manner to provide automatic volume control and uniformity of the signals recorded on the seismogram.

For a more detailed explanation of the invention, and for further objects and advantages thereof, reference should be had to the following detailed description taken in conjunction with the accompanying drawings, in which.

Figure 1:
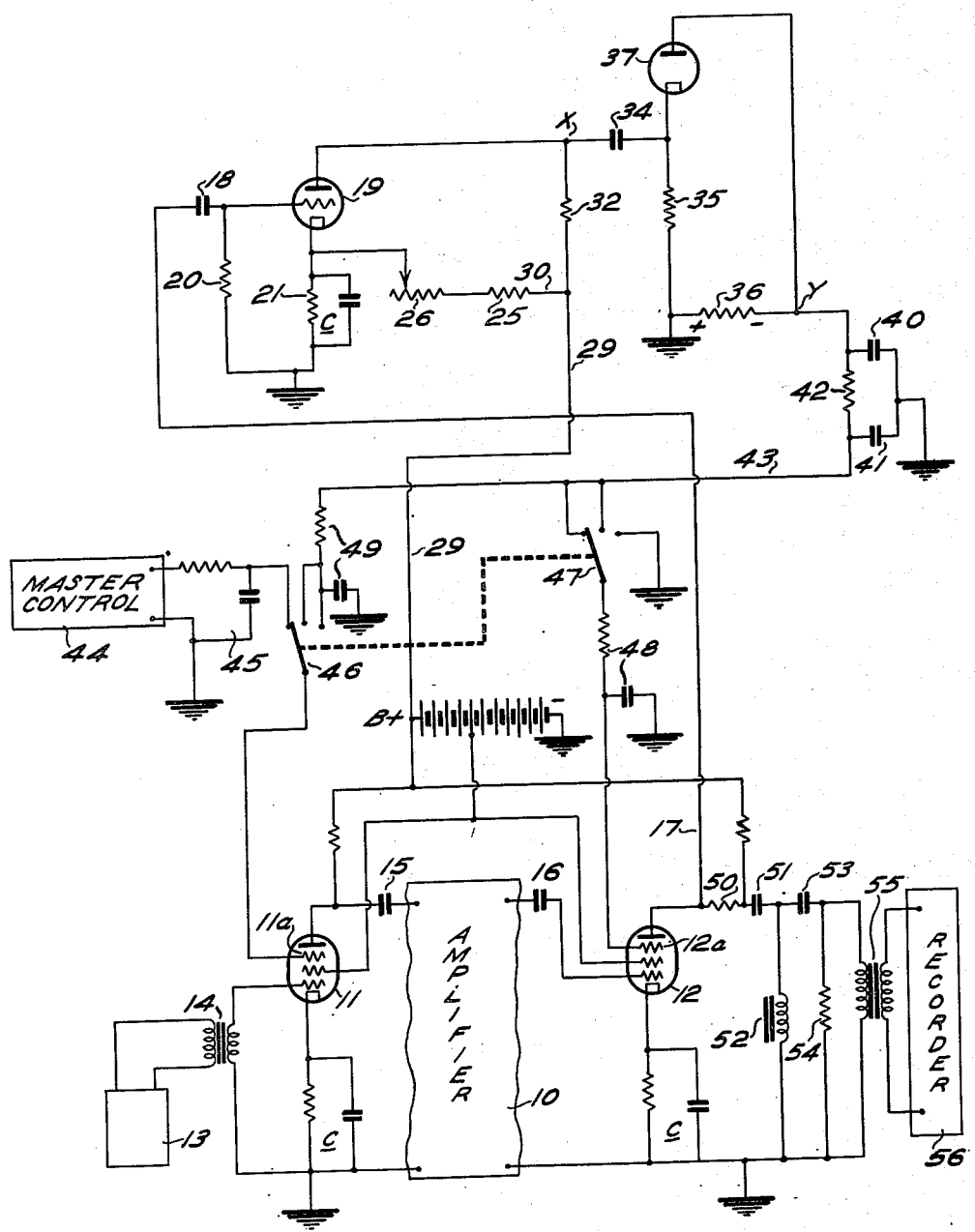
Fig. 1 is a wiring diagram of a typical embodiment of the invention.

Referring to Fig. 1, the invention in one form has been shown as applied to an amplifier 10, more or less conventional in design, and including one or more electric valves or thermionic tubes, two of which, the valves 11 and 12, are shown. The valve 12, of type 6J7 instead of a 6G6, is a higher-gain tube than the conventional output tube. A sensitive detector of seismic signals, such, for example as a geophone 13, applies by way of transformer 14, seismic signals to the input circuit of the pentode tube 11. The output circuit thereof is capacitively coupled by the capacitor 15 to the next stage of the amplifier 10. After amplification by other stages (not shown) the amplified signals are applied by way of capacitor 16 to the input circuit of the pentode 12. A suitable source of anode supply is indicated at B+ and B—. From this source, conventional connections are shown for the supply of plate current and for the application to the screen grids of the required screen grid potentials.

In accordance with the invention, amplified seismic signals are derived from the high-gain stage 12 of the amplifier as by conductor 17 and applied by capacitor 18 to the input circuit of an electric valve 19. The valve or triode 19 is provided with grid resistor 20 and a cathode grid-biasing means C. The grid of valve 19 is at all times negatively biased beyond plate current cut-off by means of a variable resistor circuit including resistors 25 and 26. More particularly, current from the source of supply flows from B+ by way of conductors 29 and 30, through resistors 25 and 26, and downwardly through cathode resistor 21 to ground, which corresponds with the negative side B—, of the source of supply. By suitably adjusting resistor 26, the magnitude of the current flowing through the resistor 21 may be controlled, thereby to predetermine the magnitude of the negative bias introduced into the grid circuit which, of course, includes resistors 20 and 21. The particular setting of variable resistor 26 is selected to produce on the recording trace, signals of optimum amplitude for analysis.

The conductor 29 also forms a part of the anode supply circuit for the valve 19, this circuit further including a resistor 32 of relatively high value, for example, of the order of 500,000 ohms. This relatively high resistance imparts poor voltage-regulation characteristics to the anode-supply circuit of valve 19. In other words, when applied signals of predetermined amplitude render the valve 19 conductive, the resulting flow of unidirectional current through the resistor 32 produces a large IR drop so that at the point X, the circuit or anode potential drops to a very low value, approaching zero as a limit.

The output from the electric valve 19 is applied by capacitor 34 to a control network which includes a resistor 35 in one branch or circuit, a resistor 36 and a rectifier, shown as a diode 37, in a second branch or circuit thereof. It will be at once apparent that the charging circuit for the capacitor 34 may be traced from the positive source of supply, B+, by way of conductor 29, resistor 32, the capacitor 34, and by resistor 35 to ground.

Though this charging circuit has been traced as between B+ and B— or ground, it is to be understood that the capacitor 34 is under the control of the electric valve 19. When the valve 19 is rendered conductive, the voltage at the point X drops to a small value. Hence, the capacitor 34 discharges through resistor 35 and through a circuit in parallel therewith including the resistor 36 and the diode 37. On the other hand, when the valve 19 is non-conductive the voltage at the point X is high and the capacitor charges.

Due to the unidirectional or non-linear characteristic of the rectifier or diode 37, current flowing through the second circuit during the charging of capacitor 34 is negligible. However, the diode 37 does provide a discharge path parallel to resistor 35 for the capacitor 34 which may be traced from one side thereof by way of the valve 19 and bias circuit C to ground, and thence through resistor 36 (of approximately 2 megohms), the diode 37, and to the other side of the capacitor 34. Thus, upon discharge of condenser 34, a portion of the current flows through the resistor 36 in a direction such that the side adjacent the point Y is negative with respect to ground.

It will, therefore, be seen that the valve or diode 37, with its associated circuits, produces a voltage directly proportional to signal amplitude which is negative with respect to ground. Thus, with a common source of anode supply and with a minimum of circuit elements, an automatic volume control bias has been obtained. This negative bias is then applied by way of a filter, comprising capacitors 40 and 41 and a resistor 42, and by way of the conductor 43, to one or more stages of the amplifier 10.

Before describing the application of this bias to the suppressor grids of the amplifier, reference will be made to the desirability of combining with the automatic volume control system a master control system characterized by the production of means for automatically controlling the gain of the amplifier 10 during the time interval in which seismic signals are being recorded. Such a master control, shown at 44, may be of any suitable type known to those skilled in the art. It may be a combined volume contractor and expander. Preferably it is of the type shown in Minton et al. Patent No. 2,301,739. A single master control 44 may be utilized for all of the geophone channels whereas the automatic volume control system is preferably included as a component part of the amplifier provided for each geophone channel.

As shown, the master control 44 is connected by a decoupling network 45, and a single-pole three-position switch 46 to the suppressor grid 11a of the valve 11, while the AVC bias is applied by conductor 43 to a single-pole three-position switch 47 and through decoupling network 48 to the suppressor grid 12a of valve or pentode 12. The output from the amplifier 10 depends upon the joint control of the master control 44 and the automatic volume control.

As shown, the switches 46 and 47, operable together as a gang switch, in their first position connect the suppressor grid 11a to the master control 44 and the suppressor grid 12a to the automatic volume control system. In their second positions, the grids 46 and 47 are both connected to the AVC system. In their third positions the grid 11a is connected to the AVC system while the grid 12a is connected to ground. Ordinarily at least one suppressor grid of the amplifier 10 would be connected to the master control. The particular setting of the switches 46 and 47 will depend upon the character of the seismic signals detected by the geophone 13. The setting to be used will be the one which yields substantially uniform trace amplitude throughout the length of the seismogram.

Again referring to the automatic volume control system, the negative bias developed across the resistor 36 is applied by way of the filter 40—42, conductor 43, the switch 47 and the decoupling network 48 to the suppressor grid 12a. With the switches 46 and 47 in their second positions, this negative bias is applied by way of decoupling network 49 and the switch 46 to suppressor grid 11a.

The negative bias applied to the suppressor grids 11a and 12a controls the gain of tubes 11 and 12 so as to maintain relatively uniform the average amplitude of the seismic signals. The output circuit of the tube 12 includes a resistor 50, a decoupling capacitor 51, a filter, including choke coil 52 and the capacitors 51 and 53, a shunting resistor 54 and an output transformer 55. The seismic signals are applied to suitable oscillographic recording apparatus as indicated by the "Recorder" 56. Because of the automatic volume control feature, the average amplitude of the signals recorded on each trace of the seismogram by the recorder 56 are maintained at a relatively constant average amplitude.

Though the system as described maintains the average amplitude of the output signals relatively constant throughout the entire seismic record, it is to be understood it does not materially affect or restrict impulses of from one to four or more cycles' duration. These impulses are recorded in their true character so that reflections will stand out; they will show up in a distinctive manner above the random seismic signals. Thus, the filter circuit including the capacitors 40 and 41 and the resistor 42 produces a delay time of about two-tenths of a second, which time has been found satisfactory for the foregoing result.

It may be further observed that the suppressor grids at all times are negatively biased with respect to their cathodes. Therefore, they do not takes electrons from the electron stream and a negligible signal or no signal at all appears on them. Thus, no complicated decoupling network need be provided. Only the simple resistor-capacitor combinations 48 and 49 need be provided.

The high-gain valve or pentode 12 produces output signals whose voltages are several times higher than a normal output voltage at the anode. These high-voltage signals are applied to the valve 19 and when they overcome the bias voltage on the tube 19, the negative bias above described is produced. Since the voltages of these output signals are of magnified amplitude as applied to the AVC system as compared with the voltage of the signals applied to the recorder 56, it will be seen a high degree of control is provided. Yet the circuits are relatively simple and the number of circuit elements is minimized.

Figure 2:
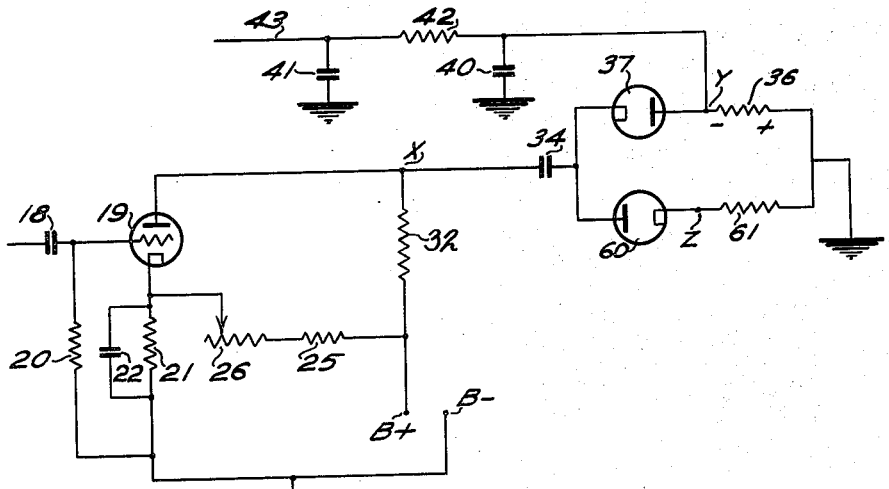
Fig. 2 is a fractional wiring diagram of a modified form of the invention.

In accordance with a further modification of the invention, Fig. 2, a second diode 60 and a resistor 61 are connected in series-circuit relation with each other and in parallel-circuit relation with the diode 37 and the resistor 36. The diode 60, however, is connected in its circuit with its polarity reversed with respect to that of the diode 37. The result is that the capacitor 34 is charged through the first circuit including the diode 60 and the resistor 61, whereas it is discharged through the second circuit including the diode 37 and the resistor 36. As before, the side of resistor 36 indicated at Y is negative with respect to ground and this negative bias may be applied by way of conductor 43 to the suppressor grids of the amplifier, or in case remote cutoff tubes are utilized, to the control grids thereof.

It may be further observed that there will be developed across the resistor 61 a voltage whose polarity is positive with respect to ground. This positive voltage will also vary in amplitude with the signal voltage and may be utilized for further control purposes, as for example in gain-control circuits where a varying positive voltage is required to control the gain.

Figure 3:
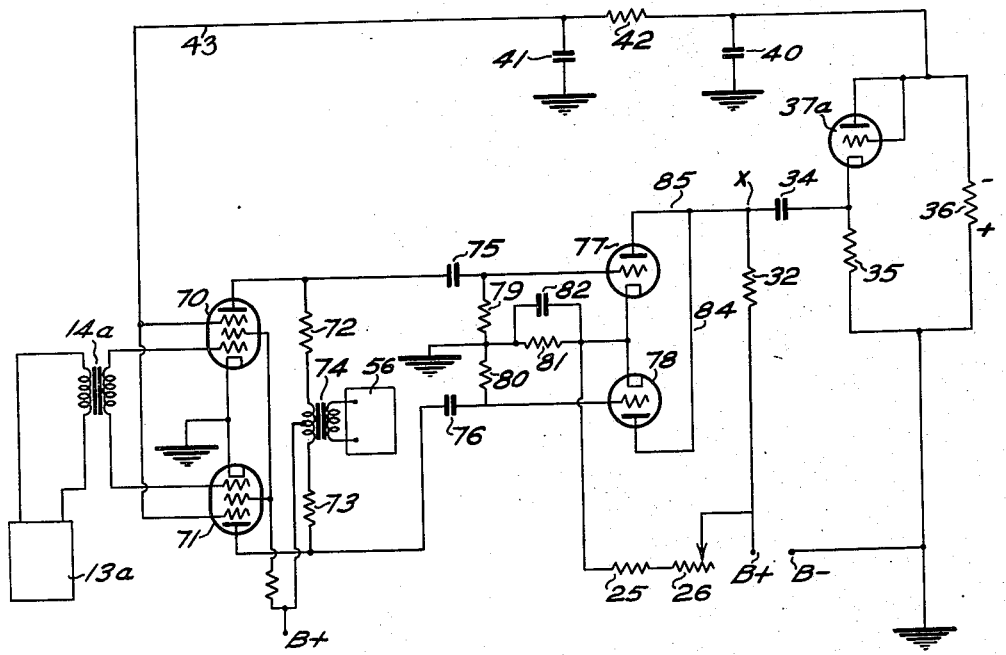
Fig. 3 is a diagram of a further modification of the invention.

The present invention is also applicable to amplifier systems of the push-pull type. As shown in Fig. 3, a geophone 13a applies by way of transformer 14a, seismic signals to the control grids of amplifier tubes 70 and 71 connected in conventional push-pull circuit relation. The output circuit includes resistors 72, 73, the primary winding of an output transformer 74, the secondary winding of which is connected to a recorder 56. In this case, the output circuit from the push-pull amplifier is capacitively coupled by capacitors 75 and 76 to a second pair of amplifier tubes 77 and 78 connected in push-push relationship; that is, the grid or input circuits respectively include resistors 79, 80, a cathode-biasing resistor 81 and a shunting capacitor 82, whereas the output circuits are connected in parallel relation as by conductors 84 and 85. As before, a variable resistor 26 and a fixed resistor 25 form, in conjunction with resistor 81, a potentiometer circuit for biasing the tubes 77 and 78 beyond plate current cutoff. However, when seismic signals of sufficient amplitude are applied to tubes 77 and 78 to render them conductive on signal peaks, the capacitor 34 charges through a circuit including the resistor 35 and it discharges through the parallel circuit including resistor 35 as one branch and, as the other, resistor 36 and a triode 37a, connected to operate as a diode.

As before, the negative bias developed by the resistor 36 is filtered and applied by conductor 43 to the suppressor grids of the amplifier tubes 70 and 71. This system has the advantage that both the positive and negative peaks, or both halves of the seismic signals above a predetermined amplitude, are utilized to produce the control action, that is, the gain-controlling bias produced by the capacitor 34, the diode 37a and the resistors 35 and 36 operating in conjunction therewith.

In all forms of the invention, there is avoided application to the amplifier proper of a non-linear load. In AVC systems of the prior art, the use of a diode imposes a non-linear load which, in most cases, introduces distortion into the seismic waves being recorded. However, by providing the separate, or isolation, stage, capacitively coupled to the amplifier proper, there is avoided application of load thereto, together with avoidance of non-linearity which would be introduced by such a load.

Though those skilled in the art may select different circuit elements, in one form of the invention, the triode 19 and the diode 37 of Fig. 1 may be incorporated into a single tube. For example, a tube of the 6C8-G type may be utilized by connecting the anode and grid together so that one side of the tube may function as a diode. In this embodiment of the invention, the resistors 35 and 36 were respectively 500,000 ohms and 2 meghoms while the capacitor 34 was .01 microfarad. The variable resistor 26 had a value of 500,000 ohms and the resistor 25 a value of 100,000 ohms. The cathode resistor 21 was 10,000 ohms with the capacitor 22, 25 microfarads. The filter consisted of resistor 42 of 1 megohm with capacitors 40 and 41 respectively 0.1 microfarad. The remaining circuit elements were conventional and the tubes 11 and 12 of the amplifier were of the 6J7 type.

While preferred embodiments of the invention have been described, it will be understood that further modifications may be made without departing from the spirit and scope of the invention as set forth in the appended claims.

What is claimed is:

1. In combination with a thermionic amplifier having input and output circuits, of means for producing output signals of substantially constant average amplitude regardless of wide variations in the average amplitude of input signals comprising an electric valve, means including a resistor normally biasing said valve for operation beyond plate current cutoff, means for applying signals from said output circuit to said valve, the signal-peaks above a predetermined amplitude rendering said valve conductive, a source of potential for said valve having poor voltage-regulation characteristics, a capacitor, a control network connected between said capacitor and ground and including two circuits, a rectifier and a resistor connected in series in one of said circuits and a resistor and a rectifier of polarity opposite to said first-named rectifier connected in series in said second circuit, thereby to charge said capacitor through one circuit and for discharging said capacitor through the other of said circuits, the discharge of said capacitor producing a voltage negative with respect to ground, and means for applying said voltage to said thermionic amplifier in a direction to maintain substantially constant the amplitude of signals in said output circuit.

2. In combination with a thermionic amplifier of the push-pull type having input and output circuits, of means for producing output signals of substantially constant average amplitude regardless of wide variations in the average amplitude of input signals comprising a pair of electric valves connected in push-push relation, means for biasing said valves for operation as plate detectors to produce an output for signals above a predetermined amplitude, a source of anode supply for said valves having poor voltage-regulation characteristics, a capacitor, a control network including a resistor in one branch to form a charging circuit for said capacitor and a resistor and a rectifier connected in series in a second branch thereof to form a discharge circuit for said capacitor for production of a negative potential which varies in magnitude with the average value of the amplitude of said applied signals, and means for applying said negative potential to said push-pull amplifier in a direction to maintain substantially constant the amplitude of signals in the output circuit thereof.

3. The combination with an amplifier, of a gain-controlling system therefor comprising an electric valve having an input circuit responsive to signals from said amplifier and an output circuit, means biasing said valve beyond plate current cut-off, said valve being conductive only on signal peaks, biasing means for said amplifier comprising in a series loop a rectifier and two resistors, a ground connection at the junction of said resistors, said output circuit including one of said resistors and a capacitor connected to the cathode side of said rectifier and to one end of said last-mentioned resistor for flow of charging current through said capacitor, said rectifier having a polarity for flow therethrough of discharge current from said capacitor and through the other of said resistors continuously to develop across it a voltage of negative polarity with respect to said ground connection, and means for applying said negative voltage to said amplifier to control the gain thereof.

4. In a seismic prospecting system including a detector of seismic signals transmitted through the earth, an amplifier having an output circuit and an input circuit connected to said detector, means for controlling said amplifier to produce amplified seismic signals of substantially constant average amplitude regardless of wide variations in the average amplitude of said signals as detected comprising a gain control circuit including an electric valve connected to said amplifier output circuit and conductive on signal peaks above a predetermined amplitude, a source of plate potential for said valve having poor voltage-regulation characteristics, a network including a rectifier, a capacitor and resistance means, said network including one circuit for charging said capacitor through a part of said resistance means and excluding said rectifier, and a parallel circuit including said rectifier and a different part of said resistance means for discharge of said capacitor during periods of conduction by said valve of said signal peaks continuously to produce a negative potential which varies in magnitude with the average amplitude of said applied seismic signals, and means for applying said negative potential to said amplifier in a sense to maintain substantially constant the amplitude of seismic signals in said ouput circuit for recordation thereof.

5. In a seismic prospecting system including a detector of seismic signals transmitted through the earth, an amplifier having an output circuit and an input circuit connected to said detector, means for controlling said amplifier to produce amplified seismic signals of substantially constant average amplitude regardless of wide variations in the average amplitude of said signals as detected comprising a gain control circuit including an electric valve connected to said amplifier output circuit and conductive on signal peaks above a predetermined amplitude, a source of plate potential for said valve having poor voltage-regulation characteristics, a network including a non-linear impedance, a capacitor and resistance means, said network including one circuit for charging said capacitor through a part of said resistance means and excluding said non-linear impedance and a parallel circuit including said non-liner impedance and a different part of said resistance means for discharge of said capacitor during periods of conduction by said valve of said signal peaks continuously to produce a negative potential which varies in magnitude with the average amplitude of said applied seismic signals, and means for applping said negative potential to said amplifier in a sense to maintain substantially constant the amplitude of signal in said output circuit.

6. In a seismic prospecting system including a detector of seismic signals transmitted through the earth, an amplifier having an output circuit and an input circuit connected to said detector, means for controlling said amplifier to produce amplified seismic signals of substantially constant average amplitude regardless of wide variations in the average amplitude of said signals as detected comprising a gain control circuit including an electric valve connected to said amplifier output circuit and conductive on signal peaks above a predetermined amplitude, a source of plate potential for said valve having poor voltage-regulation characteristics, a network including a rectifier, a capacitor and resistance means, said network including one circuit for charging said capacitor through a part of said resistance means and excluding said rectifier, and a parallel circuit including said rectifier and a different part of said resistance means for discharge of said capacitor during periods of conduction by said valve of said signal peaks continuously to produce a negative potential which varies in magnitude with the average amplitude of said applied seismic signals, and a time delay circuit for applying said negative potential to said amplifier in a sense to maintain substantially constant the amplitude of output signals while permitting relatively short time variations of said input signal to exceed said constant amplitude.

7. A seismic signal amplifier having an output circuit, an input circuit, and a source of positive plate potential, means for controlling the gain of said amplifier to produce amplified seismic signals of substantially constant average amplitude regardless of wide variations in their amplitude as applied to said input circuit, comprising a gain control circuit including an electric valve connected to said amplifier output circuit, a circuit connected to said source of positive plate potential for normally biasing said electric valve to plate current cut-off, a resistance connected between said source of positive plate potential and the anode of said electric valve providing a source of plate potential having poor voltage-regulation characteristics, a network including a non-linear impedance and resistance means in series, a capacitor connected to the anode of said electric valve and to said non-linear impedance, said network including one circuit for charging said capacitor through a part of said resistance means and excluding said non-linear impedance and a parallel circuit including said non-linear impedance and a different part of said resistance means for discharge of said capacitor during periods of conduction by said valve on signal peaks above a predetermined amplitude to produce a negative potential which varies in magnitude with the average amplitude of said applied seismic signals, and means for applying said negative potential to said amplifier to maintain substantially constant the amplitude of signals in said output circuit.

GEORGE B. LOPER.

REFERENCES CITED

The following references are of record in the file of this patent:

UNITED STATES PATENTS

| Number | Name | Date |
| --- | --- | --- |
| 2,156,846 | Getaz | May 2, 1939 |
| 2,240,601 | Applegarth | May 6, 1941 |
| 2,247,085 | Goldman | June 24, 1941 |
| 2,250,596 | Mountjoy | July 29, 1941 |
| 2,286,106 | Ritzmann | June 9, 1942 |
| 2,304,331 | Belar | Dec. 8, 1942 |
| 2,341,232 | Norton | Feb. 8, 1944 |
| 2,346,020 | Gillespie | Apr. 4, 1944 |
| 2,352,825 | Fay | July 4, 1944 |
| 2,420,204 | Sinnett | May 6, 1947 |